United States Patent [19]

Ohtani

[11] 4,005,874
[45] Feb. 1, 1977

[54] MEANS FOR SUPPORTING A REFLECTOR ATTACHING BRACKET FOR A BICYCLE

[75] Inventor: Tadakatsu Ohtani, Sagamihara, Japan

[73] Assignee: Nichibei Fuji Cycle Co., Ltd., Tokyo, Japan

[22] Filed: Feb. 13, 1975

[21] Appl. No.: 549,744

[52] U.S. Cl. .......................... 280/289 H; 116/28 R; 188/24; 224/39; 248/214; 248/221.4; 248/221.1; 350/97

[51] Int. Cl.² .......................................... B62J 5/20

[58] Field of Search ............ 280/289, 293; 188/24; 224/30 R, 39; 350/97, 307, 99; 116/63, 28 R; 248/214, 215, 221 A, 221 C

[56] References Cited

UNITED STATES PATENTS

| 582,070 | 5/1897 | Lester | 280/289 |
|---|---|---|---|
| 2,096,380 | 10/1937 | Reicks | 248/221 A |
| 2,160,181 | 5/1939 | Taylor | 188/24 |
| 3,861,714 | 1/1974 | Evans | 188/24 X |
| 3,878,920 | 4/1975 | Fugii | 188/24 |

FOREIGN PATENTS OR APPLICATIONS

| 805,974 | 12/1936 | France | 224/39 R |
|---|---|---|---|
| 2,055,651 | 5/1971 | Germany | 188/24 |
| 651,978 | 3/1936 | Germany | 188/24 |
| 215,270 | 6/1941 | Switzerland | 280/289 |

Primary Examiner—Philip Goodman
Assistant Examiner—John P. Silverstrim
Attorney, Agent, or Firm—Toren, McGeady and Stanger

[57] ABSTRACT

An arrangement for supporting a reflector on a bicycle includes a special washer and a reflector attaching bracket, the washer and bracket are held between a brake unit and a front fork crown or a seat stay bridge by a center bolt. The special washer is provided with a hole for allowing the center bolt to penetrate therethrough and, on one face thereof, a concave surface is formed complementary to a curved surface on the front fork crown or a seat stay bridge. A lapping portion of the reflector attaching bracket which is brought into contact with the special washer is provided with a cutout space for allowing the center bolt to penetrate therethrough and the lower end of the same is formed into a folded end adapted to catch the lower edge of the special washer. This makes it possible to assemble the reflector attaching bracket without making any changes in a conventional brake unit, front fork and frame.

3 Claims, 6 Drawing Figures

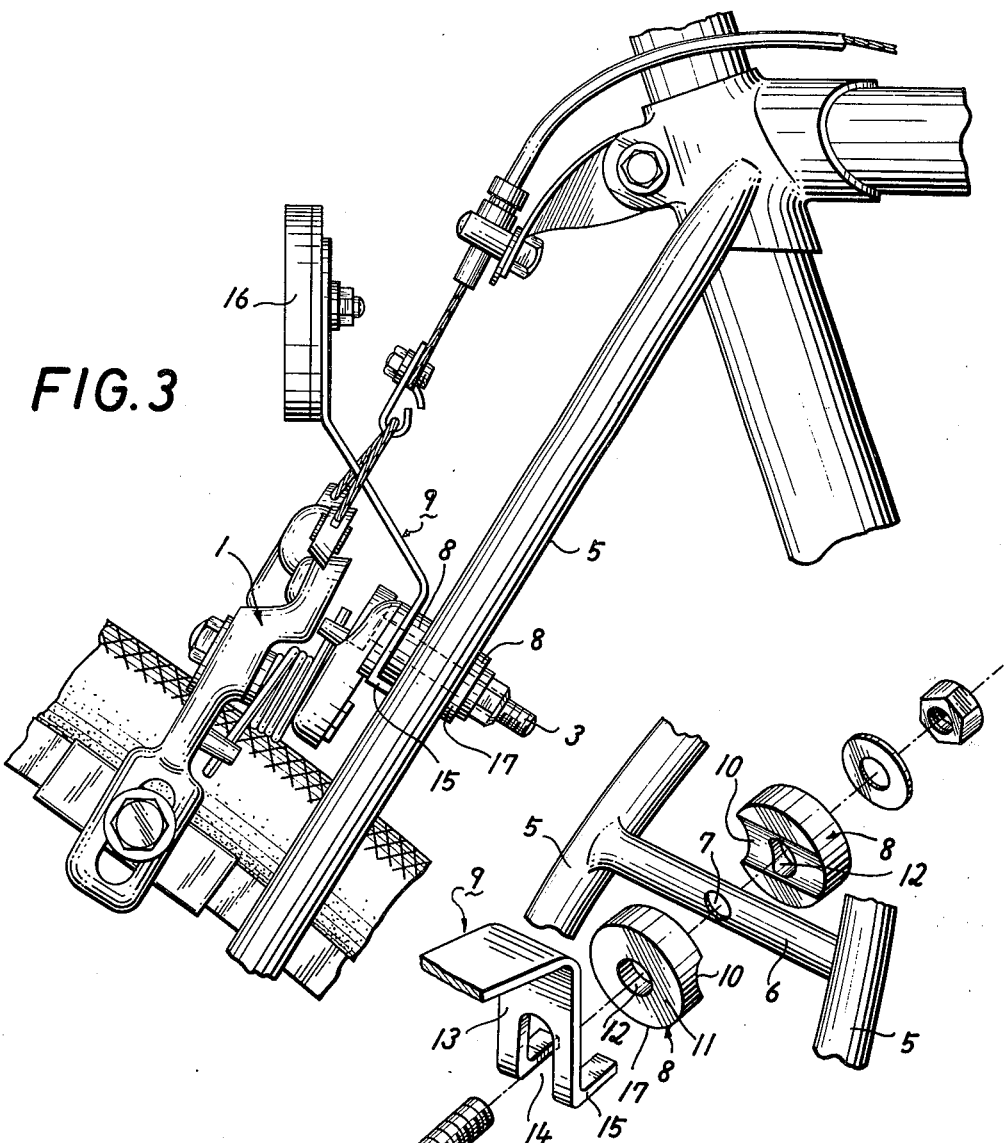
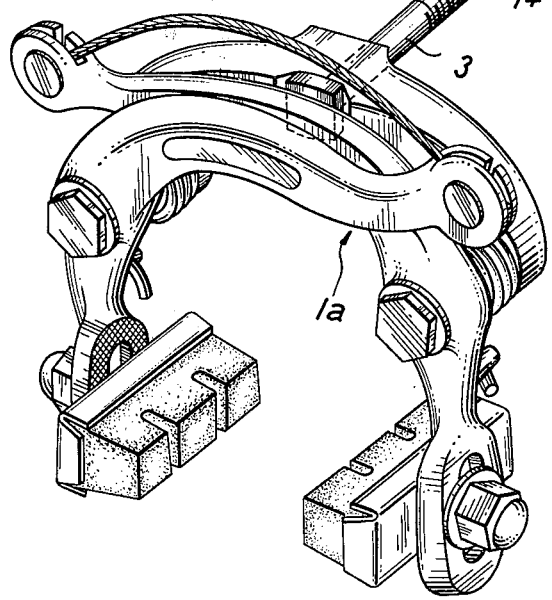

MEANS FOR SUPPORTING A REFLECTOR ATTACHING BRACKET FOR A BICYCLE

BACKGROUND OF THE INVENTION

This invention relates to a means for supporting a reflector on a bicycle and, more particularly, to improvements in a special washer and a reflector attaching bracket for equipping a front or rear reflector, which is mounted at an end of the bracket, to a bicycle having no mudguard, i.e. for holding the front reflector attaching bracket between a front caliper brake unit and a front fork crown or holding the rear reflector attaching bracket between a rear caliper brake unit and a seat stay bridge.

It is necessary to attach a reflector to a bicycle for the sake of safety during night riding, which safety standards have recently required. Needless to say, various kinds of reflector attaching brackets have been provided. The present invention, however, can provide a means for supporting a reflector attaching bracket at a definite and proper position in regard to all directions, i.e. top, bottom, right and left, because the means consists of a special washer having a concave surface on its face corresponding to a curve of a front fork crown or a seat stay bridge to which a brake unit is secured by means of a center bolt; and the reflector attaching bracket a lapping portion of which is brought into contact with the other face of said special washer, said lapping portion being provided with a cut-out space for allowing the center bolt to penetrate therethrough, the lower end of said lapping portion being formed into a folded end adapted to engage with the lower edge of the special washer.

SUMMARY OF THE INVENTION

It is an object of the invention to provide a means for a bicycle comprising a special washer and a reflector attaching bracket which are supported between a brake unit and a front fork crown or a seat stay bridge by means of a center bolt which has been conventionally used to secure the brake unit to the front fork crown or the seat stay bridge. Such a means can make it possible to equip the reflector attaching bracket to a bicycle having no mudguard by utilizing conventional parts as they are.

It is another object of the present invention to provide a special washer which has on one face thereof a concave surface corresponding to a curve of a front fork crown or a seat stay bridge; and a reflector attaching bracket the lower end of which is a folded end adapted to engage with the lower edge of the special washer, whereby the reflector attaching bracket can be placed to take a pre-determined and definite direction and, as a result, a bicycle can be assembled quickly and readily.

BRIEF DESCRIPTION OF THE DRAWINGS

FIG. 3 is a side view of the rear part of a bicycle, illustrating the reflector attaching bracket fixed to a seat stay bridge;

FIG. 4 is an exploded perspective view of FIG. 3, showing how each part of the invention is assembled;

DETAILED DESCRIPTION OF THE INVENTION

Figure 1:
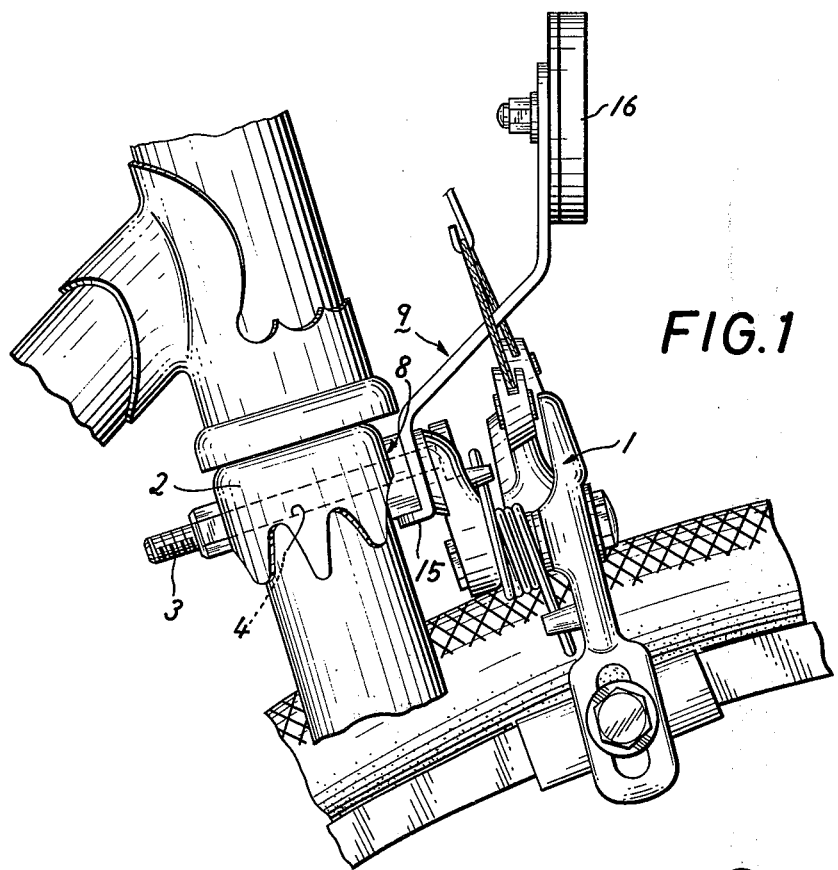
FIG. 1 is a side view of the front part of a bicycle, illustrating a reflector attaching bracket fixed to a front fork crown.

A front brake unit 1 is attached to a front fork crown 2 by means of a center bolt 3, a threaded end of which is adapted to penetrate a hole 4 of the front fork crown 2. A nut is screwed to the threaded end of the bolt 3 via a washer. In order to secure a rear brake unit 1a to a bridge 6 of a seat stay 5 (See FIG. 4), the center bolt 3 is first penetrated through a hole 7 formed in the seat stay bridge 6 and then a nut is screwed to the center bolt 3 via a washer. Otherwise, a special washer which is similar to the special washer 8 and one face of which corresponds to a curve of the seat stay bridge 6 may be attached to the threaded end of the center bolt protruding from the seat stay bridge 6 and then a washer and a nut may be fitted to said threaded end. The latter manner can provide more reliable support.

One of the features of the present invention lies in such a fact that special washers 8 and reflector attaching brackets 9 are placed between the front brake unit 1 and the front fork crown 2 and between the rear brake unit 1a and the seat stay bridge 6 and supported by means of the center bolts 3 which are adapted to fix the front and rear brake unit 1, 1a to the fork crown 2 and the seat stay bridge 6, respectively.

Figure 2:
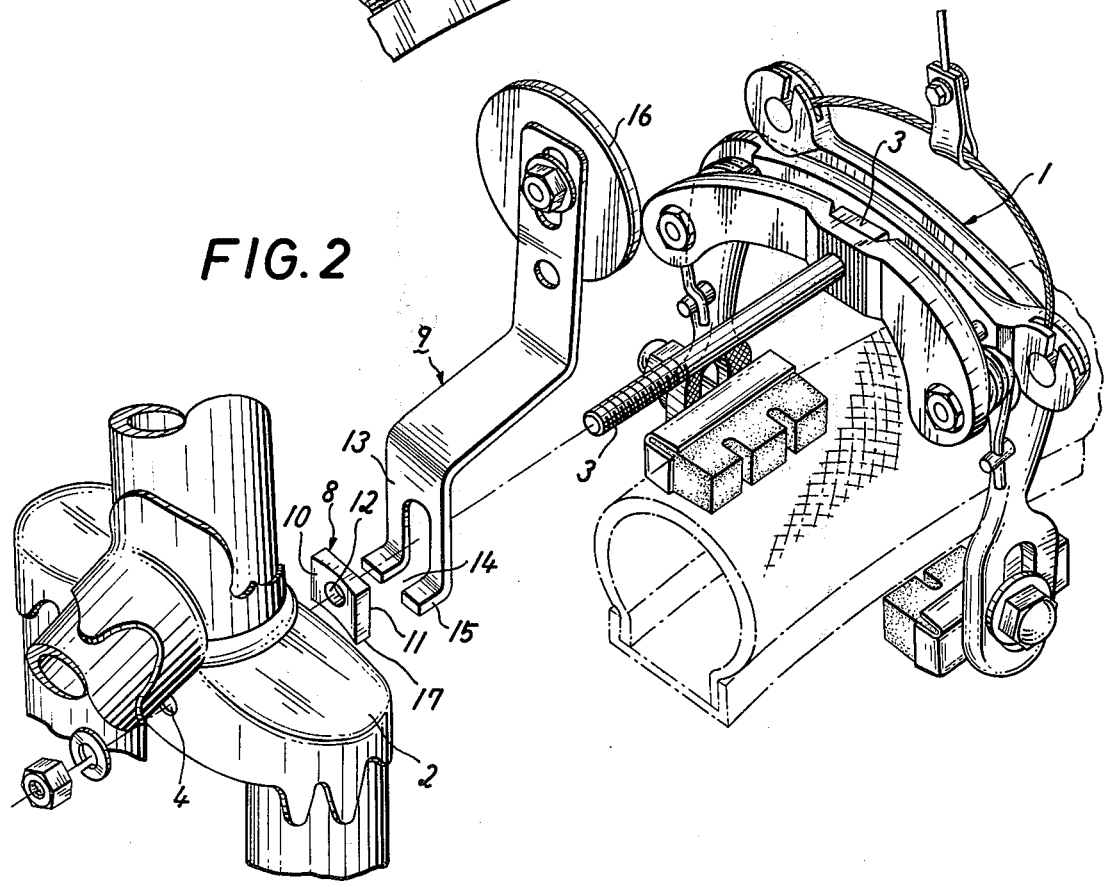
FIG. 2 is an exploded perspective view of FIG. 1, showing how each part of the invention is assembled.

The special washer 8 can be varied in its shape in many ways. For example, one shown in FIG. 2 is rectangular in section and one shown in FIG. 4 is round in section. One side of either special washer which is adapted to come in touch with the front fork crown 2 or the seat stay bridge 6 is formed into a concave surface 10 corresponding to a curve of the front fork crown 2 or the seat stay bridge 6. The other side 11 of the special washer 8 is generally flat. The special washer 8 has a hole 12 at its middle for allowing the center bolt 3 to penetrate therethrough.

As shown in FIGS. 2 and 4, the reflector attaching bracket 9 has a lapping portion 13 where the reflector attaching bracket 9 is in contact with the special washer 8. The lapping portion 13 are provided with a cut-out space 14 for letting the center bolt therethrough and the lower fork end of the same is bent to form a pair of folded ends 15. To the upper end of the reflector attaching bracket 9 is secured a reflector 16. For the purpose of supporting the reflector 16 in its desired position, said upper end is bent at a proper angle.

With respect to engagement of the reflector attaching bracket 9 and the special washer 8, it should be noted that the lapping portion 13 and the folded end 15 of the former are in contact with the side 11 and the lower edge 17 of the latter, respectively. After the concave surface 10 of the special washer 8 which has been in the engaged condition as mentioned above is brought into touch with the curve of the front fork crown 2 or of the seat stay bridge 6, the center bolt 3 for the front or rear brake unit is inserted through in the following order; the cut-out space 14 of the lapping portion 13 of the reflector attaching bracket 9, the hole 12 of the special washer 8, and finally the hole 4 of the front fork crown 2 or the hole 7 of the seat stay bridge 6. Then a nut is screwed to the protruding threaded portion of the center bolt 3 so that assembly of all parts involved is accomplished. In such a case that the round washer as shown in FIG. 4 is employed and the concave surface 10 thereof comes into contact with the curve of the seat stay bridge 6, it is desirable to make folded ends 15 of the reflector attaching bracket 9 long enough to extend across the lower edge of the special washer 8 and reach the lower edge of the seat stay bridge 6 because this manner can provide more reliable support of the reflector attaching bracket 9.

From the foregoing, it is obvious that the present invention makes it possible to equip a reflector to a bicycle having no mudguard with requiring only the special washer 8 as well as the reflector attaching bracket 9 and no change in a conventional brake unit, front fork, and frame. In addition thereto, the reflector attaching bracket can be placed in its proper position owing to such a fact that the concave surface 10 of the special washer 8 corresponds to the curve of the front fork crown 2 or the seat stay bridge 6 and that the lower edge 17 of the special washer 8 is supported by the folded ends 15 of the reflector attaching bracket 9.

Figure 5:
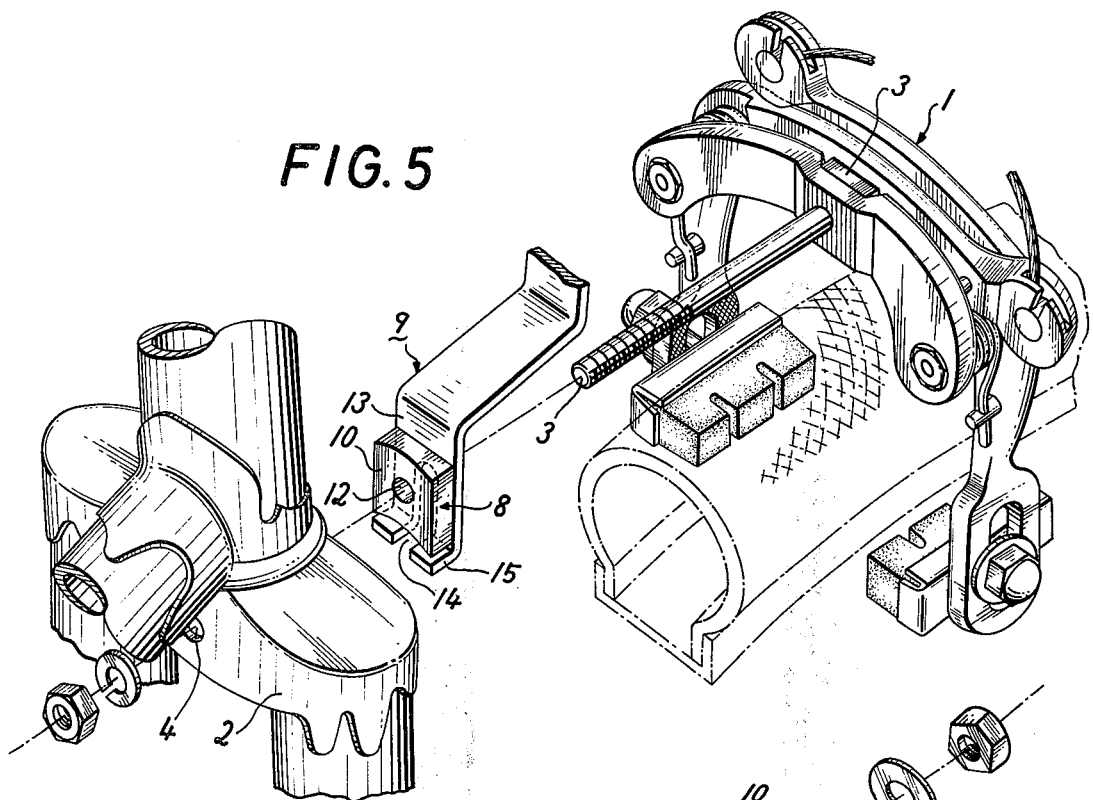
FIG. 5 is a perspective view of a modified form of the present invention, showing how each part is assembled when the reflector attaching bracket is secured to the front fork crown.
Figure 6:
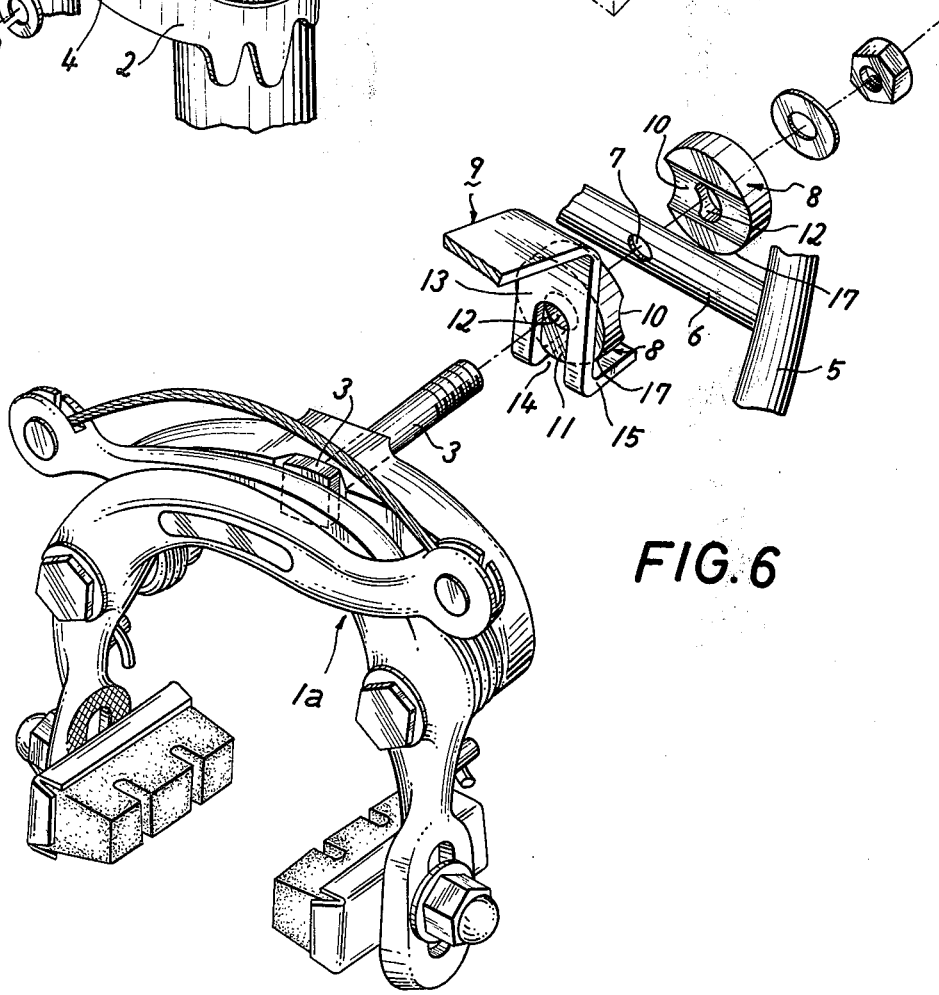
FIG. 6 is a perspective view of another modified form of the present invention, showing how each part is assembled when the reflector attaching bracket is secured to the seat stay bridge.

Referring to further embodiments shown in FIGS. 5 and 6, the special washer 8 can be fixed to the reflector attaching bracket 9 as by welding, with the bracket including, as previously described, the lapping portion 13, the cut-out space 14 and the folded ends 15. This advantageously decreases the parts in number.

What we claim is:

1. A means for supporting a reflector on a bicycle comprising a bicycle frame part having a convexly curved surface, a brake unit including a center bolt for mounting the brake unit on said bicycle frame part, a special washer provided with a hole for allowing the center bolt to penetrate therethrough, one face of said washer having a concave surface corresponding to the convexly curved surface of the bicycle frame part; and a reflector attaching bracket having a lapping portion which is brought into contact with said special washer and provided with a cut-out space for allowing the center bolt to penetrate therethrough, said reflector attaching bracket including a folded fork at its lower end adapted to engage with the lower edge of the special washer, wherein said reflector attaching bracket and said special washer are held between the brake unit and the bicycle frame part.

2. A means for supporting a reflector on a bicycle according to claim 1, wherein said bicycle frame part is a seat stay bridge, said special washer is round in section extending transversely of the hole for the center bolt and the reflector attaching bracket is supported by engaging the concave surface of the round special washer with the seat stay bridge, the lower folded fork of the reflector attaching bracket extends across the lower edge of the special washer and reaches the seat stay bridge to catch it.

3. A means for supporting a reflector on a bicycle according to claim 1, wherein said bicycle frame part is a front fork crown, and said special washer is rectangular in section extending transversely of the hole for the center bolt and the reflector attaching bracket is supported by engaging the concave surface of the rectangular special washer with the front fork crown.

* * * * *